(12) United States Patent
Clear (10) Patent No.: US 9,127,449 B2
(45) Date of Patent: Sep. 8, 2015

(54) REINFORCED MASONRY PANEL STRUCTURES

(76) Inventor: Liam Clear, London (GB)

( * ) Notice: Subject to any disclaimer, the term of this patent is extended or adjusted under 35 U.S.C. 154(b) by 537 days.

(21) Appl. No.: 12/309,795

(22) PCT Filed: Jul. 31, 2007

(86) PCT No.: PCT/GB2007/002890
§ 371 (c)(1),
(2), (4) Date: Jan. 30, 2009

(87) PCT Pub. No.: WO2008/015407
PCT Pub. Date: Feb. 7, 2008

(65) Prior Publication Data
US 2009/0313933 A1  Dec. 24, 2009

(30) Foreign Application Priority Data

Aug. 1, 2006 (GB) .................................. 0615269.8
May 4, 2007 (GB) .................................. 0708776.0

(51) Int. Cl.
*E04B 1/16* (2006.01)
(52) U.S. Cl.
CPC ........... *E04B 1/165* (2013.01); *Y10T 403/3933* (2015.01)
(58) Field of Classification Search
CPC ......... E04C 5/165; E04C 5/161; E04C 5/168; E04C 5/163; E04C 5/12; E04B 1/41; E04B 1/4178; E04B 1/4114; E04B 2001/4192; E04B 2/26; E04B 2/14; E04B 2/02; E04B 2/24; E04B 2/56; E04B 2/58; E04B 2/84; E04B 2002/0254; E04B 2002/0243; Y10T 403/3933
USPC ........ 52/238.1, 250, 251, 253, 258, 259, 260, 52/424, 425, 426, 432, 435, 439, 503, 504, 52/505, 561, 562, 565, 566, 568, 677, 678, 52/679, 684, 686, 688, 742.14
See application file for complete search history.

(56) References Cited

U.S. PATENT DOCUMENTS 666,079 A * 1/1901 Wehling ....................... 52/238.1
839,592 A * 12/1906 Jackson ....................... 52/781.3
(Continued)

FOREIGN PATENT DOCUMENTS

DE   87 11 875.0 U1   11/1987
DE   296 15 755 U1   1/1997
(Continued)

OTHER PUBLICATIONS

Machine translation of abstract of French patent FR 2352126.*
(Continued)

*Primary Examiner* — Joshua J Michener
*Assistant Examiner* — Theodore Adamos (57) ABSTRACT

A method of constructing a masonry infill in a load bearing structure comprises the steps of: laying one or more courses of masonry (7) in the infill space; partitioning off a casting space having as its base the then uppermost course of masonry (22); the casting space extending from one side of the infill space to the other; positioning reinforcing material (14) in the casting space; securing an end of the reinforcing material to the load bearing structure; filling the casting space with concrete (20), and laying one or more further courses of masonry on top of the filled casting space. The reinforced concrete forms a bond beam which strengthens the masonry. The reinforcing material may be rebar, secured to a load-bearing frame of the building by a cleat (16) having pockets (12) for reception of the rebar ends. Optionally the reinforcement may be tensioned, to pre-stress the bond beam. The bond beam may also be used to strengthen bonded, load-bearing masonry panels in bending, without being secured to an adjacent load-bearing structure.

19 Claims, 8 Drawing Sheets

(56) References Cited

U.S. PATENT DOCUMENTS

| | | | |
|---|---|---|---|
| 1,477,867 A * | 12/1923 | Dodson | 52/223.7 |
| 1,513,592 A * | 10/1924 | Johnson | 52/678 |
| 2,006,300 A | 6/1935 | Kinninger | |
| 2,281,951 A * | 5/1942 | Schroeder | 52/479 |
| 3,710,527 A * | 1/1973 | Farebrother | 52/236.7 |
| 4,781,006 A * | 11/1988 | Haynes | 52/583.1 |
| 4,939,881 A * | 7/1990 | Reinle et al. | 52/565 |
| 5,024,035 A * | 6/1991 | Hanson et al. | 52/591.1 |
| 5,636,486 A | 6/1997 | Hall | |
| 6,345,473 B1 * | 2/2002 | Fink et al. | 52/167.1 |
| 6,581,343 B1 * | 6/2003 | Metelli | 52/223.9 |
| 2002/0148187 A1 | 10/2002 | Walters | |
| 2005/0220539 A1 | 10/2005 | Yee | |
| 2007/0028552 A1 * | 2/2007 | DeLoach, Sr. | 52/677 |

FOREIGN PATENT DOCUMENTS

| | | |
|---|---|---|
| DE | 101 03 080 A1 | 7/2002 |
| EP | 0 001 360 A1 | 4/1979 |
| EP | 0 057 292 A1 | 8/1982 |
| EP | 0 784 127 A1 | 7/1997 |
| FR | 2 352 126 A1 | 12/1977 |
| GB | 424266 | 2/1935 |
| GB | 2 188 079 A | 9/1987 |
| JP | 8-260621 | 10/1996 |
| JP | 2002-180668 A | 6/2002 |
| JP | 2003-301562 A | 10/2003 |
| WO | WO 96/00333 A1 | 1/1996 |
| WO | WO 2006/032100 A1 | 3/2006 |

OTHER PUBLICATIONS

Printout of web page entitled "Concrete Building Supply", from www.concretebuildingsupply.com (printed on Feb. 11, 2007).

Drawing entitled "6" Block Wall (Fence Only)", Department of Building and Safety, City of Huntington Beach (Jul. 17, 2000).

Lane, "Tackling the Block", from www.building.co.uk, 2007 Issue 09 (printed Feb. 11, 2007).

Printout of web page entitled "Of Earthships and Straw Bales", from www.quietwater.net/bondbeam (printed Feb. 11, 2007).

Printout of web page entitled "CMU bond beam 72 inches", from sketchup.google.com (uploaded May 1, 2007).

Printout of web pages entitled "Commercial and Large Wall Contractor Menu for AB Fence Installation—Online Version", from www.allanblock.com/abfence (printed Feb. 11, 2007).

Web article entitled "Bond Bean Numerology: How Much Weight Can Various Beams Support?", from www.ecosyn.us/ecocity/Palaces/Concrete/Bond_Beams (printed Feb. 11, 2007).

Yi et al., "Behaviour of Partially Grouted Hollow Concrete Masonry Subjected to Concentrated Loads", Canadian Journal of Civil Engineering, vol. 30, No. 1, Feb. 2003, NRC Research Press.

* cited by examiner

REINFORCED MASONRY PANEL STRUCTURES

BACKGROUND

Current techniques for constructing larger buildings usually involve the use of a load bearing frame of steel or reinforced concrete, with attached cladding and/or masonry infills. In the case of masonry walls in such structures and elsewhere, it is necessary to provide additional strengthening where the area of the wall increases beyond certain limits. The strengthening is required to support the weight of the wall; to resist environmental loading such as wind forces, differences in air pressure and earthquakes; as well as to withstand other dynamic service loads such as crowd pressure, vehicle impact or explosions. The required strength for a given structure is governed not only by the laws of physics but also by local building regulations.

Traditionally where additional strength is needed, walls have been supported by cross walls, piers and areas of wall thickening. More recently the standard windpost has been developed, which occurs in most building walls (particularly interior walls), if their length exceeds 4 m. The purpose of the post is to stiffen or strengthen the walling, in circumstances of particular lateral stress from wind induced pressure differences, crowd or any other force. A wind post generally consists of a steel column secured at its top and base to the building frame or another suitable load-bearing structure. This form of construction, while effective, brings with it the following disadvantages:
1. An expansion joint is required on either side of the wind post, where it interfaces with the adjacent masonry. Filler material is inserted between post and block faces.
2. Frame ties typically at 225 mm centres must be provided between the masonry and the post on both sides.
3. Mastic will often be a specification requirement.
4. A steel post will require fire protection.
5. There may also be acoustic concerns.
7. The post typically requires four bolt fixings, two at the base and two at the soffit.
8. The post must be erected before the walling and so isolated access (e.g. scaffolding) is required for safe work practice particularly at height.

Our invention seeks to replace the windpost and also achieve many other positive characteristics in strengthening panels of bonded masonry such as masonry walls, both load bearing and non load bearing.

GB2188079 concerns an earthquake-resistant building structure formed from self assembling (dry jointed) blocks and having a reinforced concrete frame cast in situ within the blockwork as assembly of the latter proceeds.

SUMMARY OF THE INVENTION

Accordingly, in one aspect the present invention comprises a method of constructing a masonry structure comprising reinforced concrete therein, characterised in that the structure comprises an infill in a space formed in a pre-existing load bearing structure, the method comprising the steps of:
laying one or more courses of masonry in the infill space;
partitioning off a casting space having as its base the then uppermost course of masonry; the casting space extending from one side of the infill space to the other;
positioning reinforcing material in the casting space;
securing an end of the reinforcing material to the load bearing structure;
filling the casting space with concrete, and
laying one or more further courses of masonry on top of the filled casting space.

The reinforced concrete in the resulting structure forms a "bond beam" which acts to strengthen the masonry panel against transverse loading/deflection and helps to secure the panel in the infill space. The bond beam acts to transmit transverse loads to the load bearing structure on one or both sides of the infill space, preventing excessive deflection and destruction of the masonry infill panel within enhanced predetermined design limits.

The step of partitioning off the casting space may comprise installing shuttering e.g. aligned with the inner and outer faces of the masonry courses. However, preferably a masonry course (or several such courses) itself defines inner and outer walls on either side of the casting space. Where the masonry is a single thickness of blockwork, this course may be formed from special blocks having a U-shaped cross-section. The reinforcement and concrete is thus placed in the cavity defined between the limbs of the U. In this simple manner the need for dedicated removable shuttering is avoided. On their exterior, the masonry course or courses containing the concrete are indistinguishable from the adjacent masonry. This can have aesthetic advantages.

The reinforcing material may comprise steel bar (e.g. "rebar"). The optimum or acceptable relative section areas of the concrete and steel and the positioning of the bars in the bond beam may be calculated in accordance with standard engineering principles for beams subjected to point and/or distributed loading, taking into account design service conditions such as anticipated impact and wind loading, etc. If the bond beam is cast within blocks or other masonry units as described above, the concrete will key to these and their presence can therefore be taken into account when determining the size and position of the steel bars. Allowance must be made for any reduction in compressive strength caused by the presence of the mortar joints in the masonry.

The secured end of the reinforcing bar may be received in a socket anchored to the load bearing structure. Where the load bearing structure is formed from reinforced concrete, the socket may be formed in or attached to an anchor body inserted (e.g. cast) into the load bearing structure. Where the load bearing structure is a metal (e.g. steel) frame, the socket may be formed in a cleat secured (e.g. bolted) to the frame.

The reinforcing bar may be a snug sliding fit in the socket (e.g. there may be a total radial clearance of 1 mm or less for a rebar of 16 mm diameter). This allows relative longitudinal movement to take place between the reinforcing bar and the socket, thereby accommodating differential expansion between the masonry infill and the load bearing structure. Suitable seals or sealant may be applied to prevent the wet concrete from entering the socket as the bond beam is cast. Under transverse loading of the masonry, the reinforcing bar ends engage the interior sides of the sockets and transfer the transverse loads to the load bearing structure. Under such loading, the bond beam and reinforcing bars will tend to bow. Reaction forces from the sockets at the bar ends and the stiffness of the bond beam and surrounding masonry tend to restrain and prevent excessive lateral movement of the masonry, whilst the sliding fit of the bar ends in the sockets still allows for thermal movement.

Alternatively, to withstand higher lateral loads on the masonry infill, the reinforcing bars may be longitudinally fixed in the sockets and provided with a turnbuckle, end nut or similar means by which they can be pre- or post-tensioned, to produce a prestressed masonry and bond beam structure. Such an arrangement also reduces or eliminates differential horizontal movement between the side edges of the masonry and the load bearing structure. It may therefore obviate the need for expansion joints in this area. However, the load bearing structure must then be designed to accommodate the forces imposed by the bond beams and the reaction forces from the masonry, including variations in these with any tendency for differential expansion of the masonry, bond beam and load bearing structure.

One or more courses of masonry above and/or below the concrete of the bond beam may be tied into the concrete by reinforcements extending into the concrete and into mortar filled spaces in or between the units of masonry in these courses. For example, rebar or special brackets may be cast into the concrete so as to extend into the vertical mortar joints (perpends or "perps") in the adjacent course. Where the concrete is cast in the gap between the limbs of a U-cross-sectioned block, the reinforcement may extend upwardly, since it can then immediately enter a mortar filled recess in the next course. The U-profiled blocks may also be manufactured with holes in their bases, through which the reinforcement can pass into perpends of the course below. The reinforcement may comprise L-shaped brackets, each having one limb embedded in the concrete of the bond beam, and another limb extending into an adjacent perpend. The brackets may be formed from stainless steel strip, for added stiffness and corrosion resistance compared to carbon steel. The brackets may comprise apertures or other formations to help them key into the concrete of the bond beam and/or the mortar of the perpends.

Edges of the masonry infill may be secured to the load bearing structure by other means besides the attachment at the reinforcement. Fixings which are conventional in themselves, such as metal brackets and head restraints, can be used for this purpose. Mortar beds between courses may also be reinforced by means which are conventional as such, for example using metal wire or mesh. However, where the above described perpend reinforcements are used, surprisingly it has been found that a stronger masonry panel can be produced when the mortar beds between courses are not reinforced.

More than one reinforced concrete filled casting space as described above can be provided, thereby providing effective reinforcement of tall masonry infills.

The invention correspondingly provides a masonry structure comprising reinforced concrete therein, characterised in that the structure comprises an infill secured in a pre-existing load bearing structure, the infill comprising one or more courses of masonry at the base of an infill space in the structure; the infill above this course incorporating a reinforced concrete casting extending from one side of the infill space to the other, an end of the concrete reinforcement being secured to the load bearing structure, the infill comprising one or more further courses of masonry above the reinforced concrete casting.

In a further aspect, the invention provides a fitting for securing an end of a concrete reinforcement bar to an adjacent load bearing structure, the fitting comprising a body securable to the structure and a socket in the body for receiving an end of the bar therein in use, characterised in that the socket receives the bar end so as to allow relative longitudinal sliding movement of the bar but so as to restrain relative transverse movement thereof. This allows for thermal movement of the bar and the structure reinforced by it, relative to the load bearing structure; at the same time allowing transverse loads applied to the socket through the bar end to be reacted against and resisted by the load bearing structure.

The fitting may further comprise a closure mountable thereon for closing off the end of a casting space into which the reinforcement bar extends. The fitting and closure may therefore be used to form an expansion joint between the load bearing structure and the body of concrete in which the reinforcing bar is encased. The closure may be retained on the fitting in the finished joint (e.g. when an expansion gap between the encasing concrete and the load bearing structure has been filled with a suitable jointing material); or the closure may be removed once the concrete has set, but before the joint is finished.

The fitting may comprise a boot or collar mountable adjacent to an opening in which the reinforcement bar is received. This may be used to prevent penetration of wet concrete into the socket and/or to provide a compressible region adjacent to the socket, to accommodate thermal or other movement of the reinforcing bar and its encasing concrete, relative to the load bearing structure; the end of the bar being a fairly loose sliding fit in the socket, as described above. The boot may cover the fitting where it is embedded in the reinforced concrete, to provide a slip plane that accommodates horizontal movement of the surrounding concrete relative to the fitting. The boot may be radially compressible to accommodate vertical movement of the surrounding concrete relative to the fitting.

The body may comprise a mounting plate. A plurality of sockets may be provided in the body, e.g. a pair of sockets arranged to hold a pair of reinforcement bars spaced apart and parallel to each other. The socket may comprise a substantially cylindrical side wall.

In a yet further aspect, the invention provides a panel of masonry units reinforced by means of a course of said masonry units which are hollow so as to define a continuous cavity extending therealong, the cavity being filled with reinforced concrete, characterised in that the masonry units are laid in mortar or a like bonding material and the panel is reinforced in transverse bending by the reinforced concrete.

The reinforced concrete may make the panel more resistant to pressure differences such as those induced by wind or explosions, lateral forces caused by impacts, earthquakes or loads attached laterally of the panel, e.g. in cantilever fashion.

Besides strengthening the panel in transverse bending, the reinforcement is also effective in unifying the panel and isolating the masonry on one side either above or below the reinforcement from the effects of any discontinuities or weaknesses in the panel on the other side of the reinforcement. For example, reinforcement courses as described above may be provided above and/or below a region of the bonded masonry panel containing apertures for windows, doors, and/or service penetrations. For design purposes, the part of the panel above the upper reinforcement course and the part below the lower reinforcement course may be treated as separate panels reinforced along one edge. Such a construction is useful for example in load bearing masonry forming a three or four storey exterior wall of a building having a lightweight (e.g. stud and plasterboard) internal wall construction. Flats and small to medium sized office accommodation are often built in this way.

The hollow masonry units may have a U-shaped cross-section, so as to form a casting space for the reinforced concrete. The reinforcement may extend from the concrete into adjacent courses of masonry units. The reinforcement may comprise L-shaped brackets extending from the concrete into adjacent courses of masonry. The reinforcement may extend from the concrete through apertures in the bases of the hollow masonry units.

Further features and advantages of the invention will be apparent from the following description of an illustrative embodiment made with reference to the drawings.

BRIEF DESCRIPTION OF THE DRAWINGS

FIG. 6a is a horizontal section through a fixing channel and surrounding concrete, used when securing the cleat of FIG. 6 to a load bearing structure formed from concrete;

DETAILED DESCRIPTION OF THE INVENTION

Figure 1:
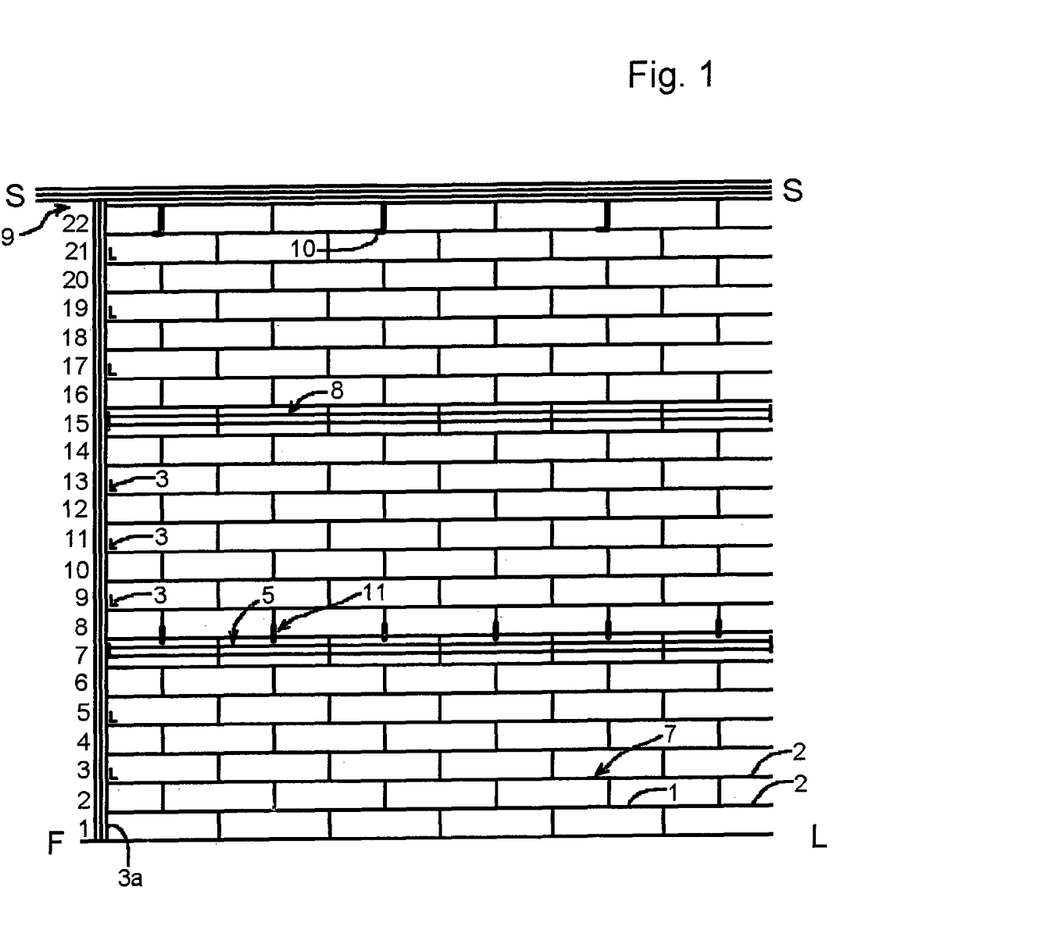
FIG. 1 is a diagram of an example of a blockwork infill wall embodying the invention.

The infill wall section diagrammatically shown in FIG. 1 consists of 22 courses of blocks (labelled from floor level FL to soffit SS 1-22) laid with standard 10 mm mortar joints and incorporating two vertically spaced bond beams. The materials specification for the wall is:

1. Aquaguard® D.P.C. to first course.
2. Bed joint reinforcement every course (at 225 mm centres) BRC 3.5 mm galvanised.
3. 175 mm Ancon® frame ties at 450 mm centres to vertical end steels 3a.
4. 12 mm thick×140 mm wide, Corofil® expansion joint strip at junction of steel and blockwork vertically.
5. Seventh course bond beam:
Hollow block exterior dimensions (in mm, to match other blocks in wall): 140 W×215 D×440 L
Hollow section interior dimensions (each block, in mm): 80 W×167 D×440 L. This provides sufficient strength to the resulting bond beam, and sufficient concrete cover for corrosion protection of the rebars, as may be required by local building regulations and standards.
Hollow filled with 40N concrete mix and two 16 mm sections of rebar, rebar full length of wall 8.1 m long. Clearances between lower face of concrete and lowest point of bottom rebar, between highest point of lower rebar and lowest point of upper rebar, and between highest point of upper rebar and upper surface of concrete, each of 47.5 mm. This gives a total beam depth of 174.5 mm, so the upper surface of the concrete stands slightly proud of the hollow in the surrounding blocks. This still allows a 10 mm bed joint to the course above, as visible in the wall faces. Alternatively, the hollow section depth dimension D can be made to match that of the finished beam: 174.5 mm in the above example.
6. Rebar slotted into two specially designed cleats with insertion pockets to allow e.g. 85 mm of rebar to penetrate, this achieved at both ends of steel. These cleats may be fixed to vertical beam with M12 bolts 2 No. A clearance of e.g. 15 mm exists between the bottom of each insertion pocket and the adjacent rebar end, and the bar is therefore free to move longitudinally in the socket, to allow thermal movement of the infill relative to the support structure.
7. Infill wall built with 140 mm×215 mm×440 mm blocks, Hanson Evalite® 7N medium density.
8. At course 15 the identical detail repeated as for Nos. 5 and 6. (Course 7)
9. At junction of soffit and blockwork 20 mm deflection joint formed, 20 mm of Corofil® jointing strip used to fill this void.
10. 1HRV telescopic head restraints fitted to soffit horizontal beam at 900 mm centres.
11. Course immediately above beam has strength transfer rods fixed from concrete up into perps of block course directly above and below.

For lower walls a single mid height horizontal bond beam may be sufficient. For higher walls a series of beams located to maximise key stress resistance, identical or similar to the specification above, is preferably used. The exact positioning and number of the bond beams may be varied so as to meet design requirements. Other forms of edge fixing and head restraints may be used instead of or together with the frame ties and telescopic head restraints. For example lengths of angle iron can be welded to the soffit and/or upright steels, e.g. 300 mm wide×100 mm deep×8 mm flange thickness galvanised angle iron brackets, at 450 mm centres, provided alternately against the front and rear faces of the wall. (That is, with adjacent brackets for a given face at 900 mm centres, and the brackets symmetrically staggered to front and rear). Wider blocks may be used, for example 215 mm wide. A wider cavity for the bond beam may be formed in that case: e.g. 180 mm wide in a block 215 mm wide. The cavity can accommodate pipes, ducts, conduits, cables and similar services, besides the reinforcement.

Figure 2:
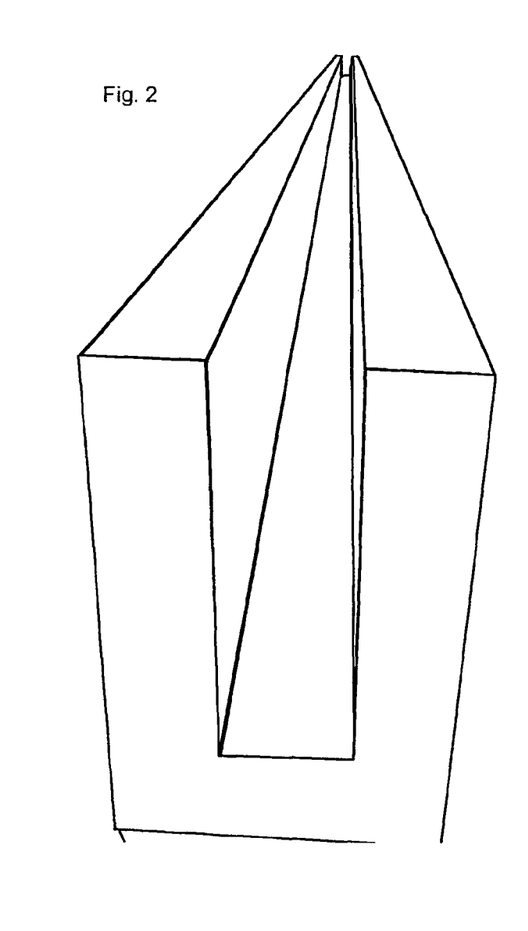
FIG. 2 shows a course of U-profile blocks laid ready for reception of reinforced concrete to form a bond beam.
Figure 3:
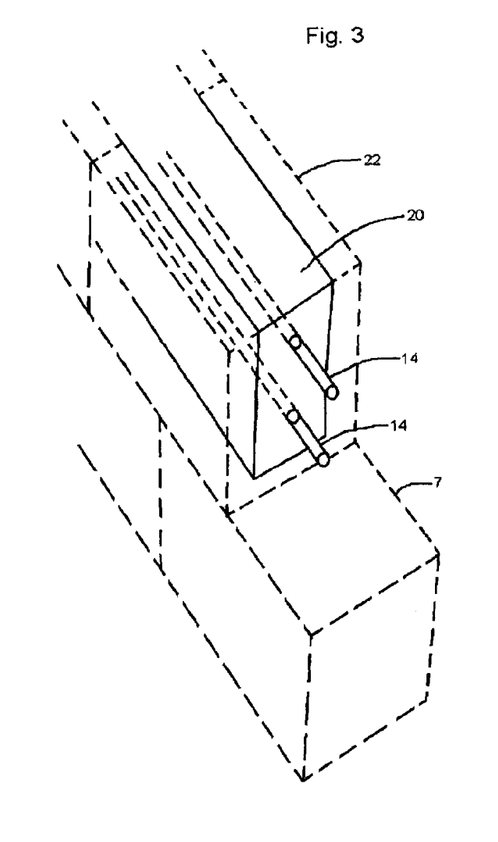
FIG. 3 is a diagrammatic cut away view of the reinforced concrete, with the surrounding blocks indicated in phantom.
Figure 3A:
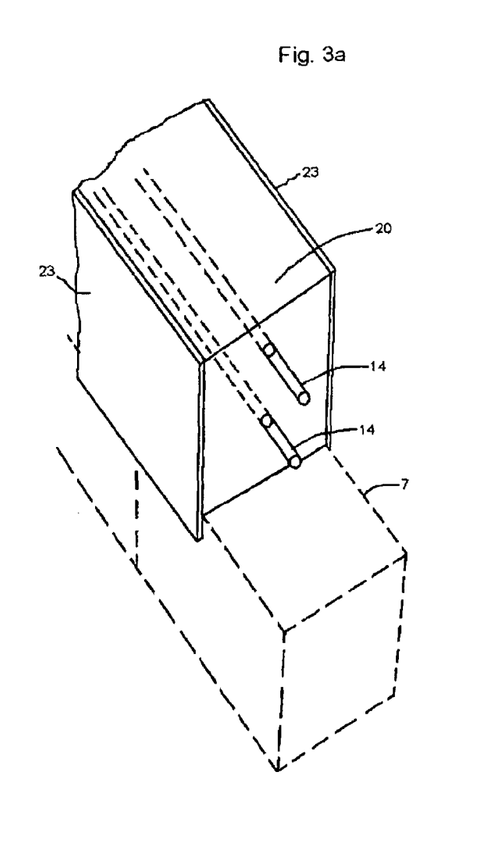
FIG. 3a corresponds to FIG. 3 but shows a modified embodiment of the invention.
Figure 4:
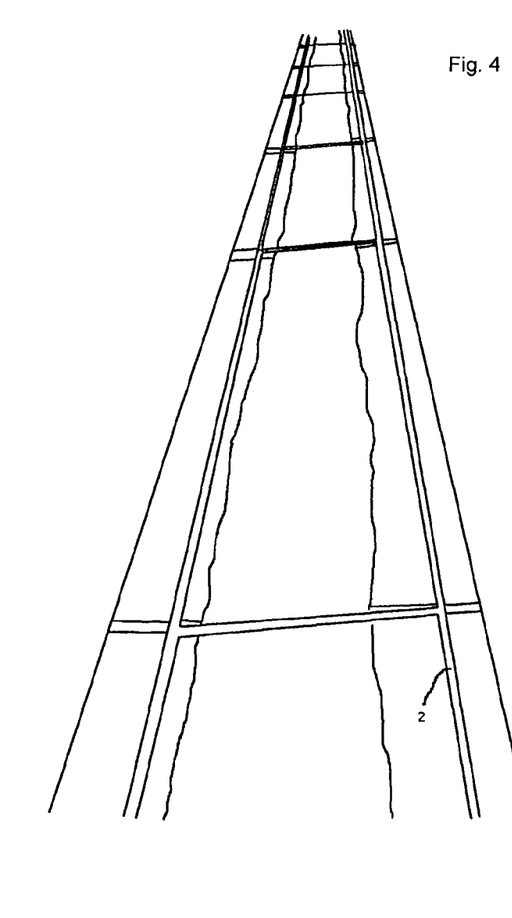
FIG. 4 corresponds to FIG. 2, but shows the wet concrete in situ.

When the course of hollow blocks is constructed, the block end faces are "buttered" with mortar and the resulting perpends pointed in the usual way (FIG. 2). To form the wall as shown in FIG. 1, we then fill the aligned hollow block interiors from the bottom with a 47.5mm layer of concrete. The lower rebar is then placed centrally on top of this layer. We then fill the hollows with a further 16 +47.5mm concrete layer. We then place the second rebar on the concrete, as with the first. We then add the final 16 +47.5mm of concrete to completely fill the hollows and encase both rebars. The next run of reinforcing wire mesh is then placed in position, ready to form the next bed joint (FIG. 4). The resulting structure is also sketched diagrammatically in FIG. 3, which shows a cutaway section of the continuous concrete bond beam 20 and its reinforcing rebars 14. The bond beam is contained within a course of hollow blocks 22 indicated in phantom. The next lower course of solid or complete blocks 7 is also indicated in phantom. FIG. 3a shows an alternative embodiment, in which shuttering 23 is used to contain the wet concrete, in place of the course of hollow blocks 22.

The four end points of rebar are connected to the load bearing structure (the vertical steel 3a shown in FIG. 1) using special fixing cleats, one at each end of the bond beam. These cleats have a pair of sockets in the form of cylindrical pockets 100 mm deep, into which the rebar ends are inserted. The cleat has already been fixed to concrete, steel or other wall vertical end stanchion, with two no. 12 mm bolts. Other suitable fixing means can also be used to secure the cleat to the stanchion, such as welding, riveting or using a nail gun in the case of a steel stanchion, or expansion bolts or a cast-in fixing channel in the case of a load bearing structure of concrete. Other forms of reinforcement can also be used, e.g. I-beam or box section steels, or other rods, angles, strips, tendons or cables, including those formed from carbon fibre or other high strength composite materials.

Figure 5:
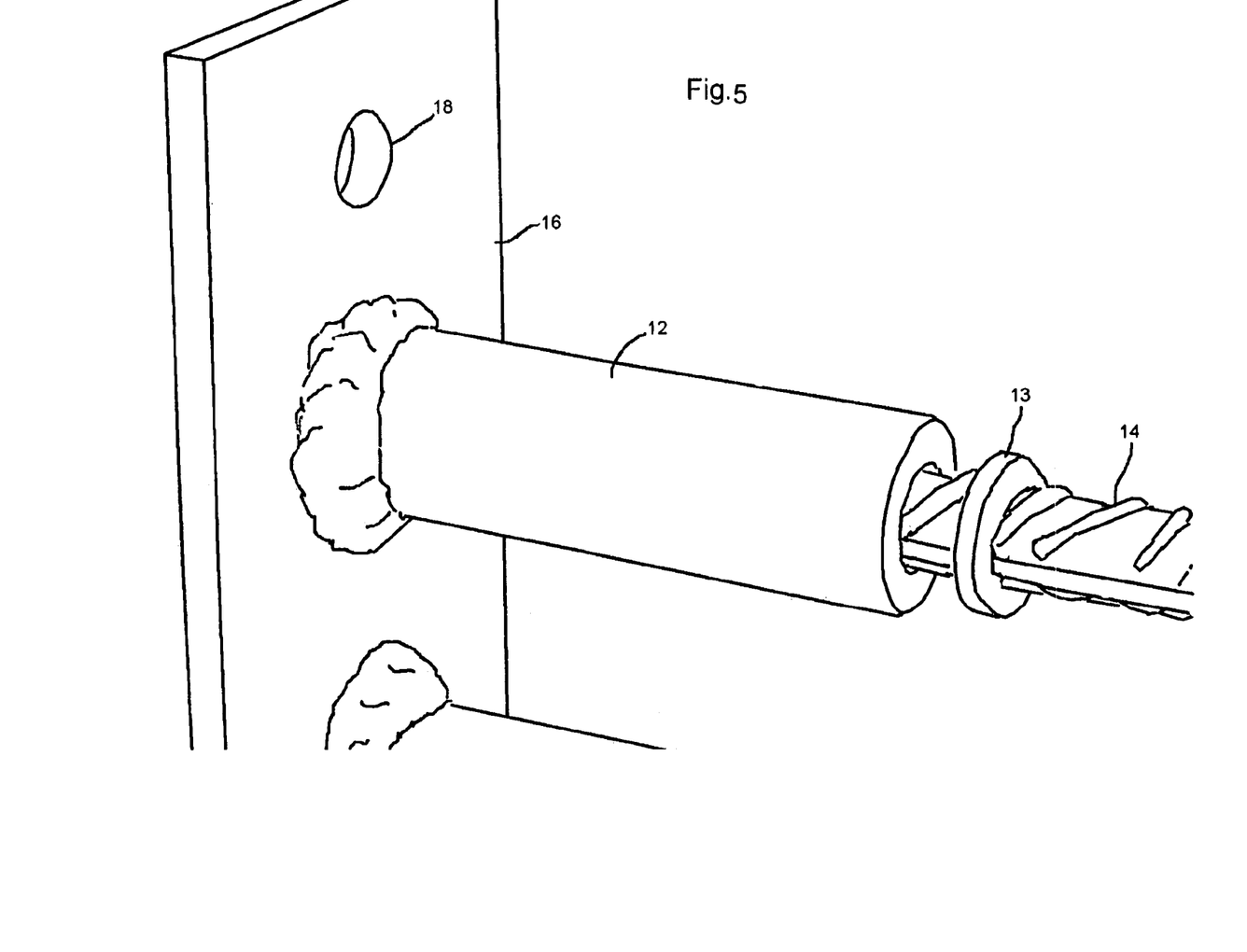
FIG. 5 shows the bond beam after the concrete has set, but with one end left incomplete for illustrative purposes.
Figures 6, 9:
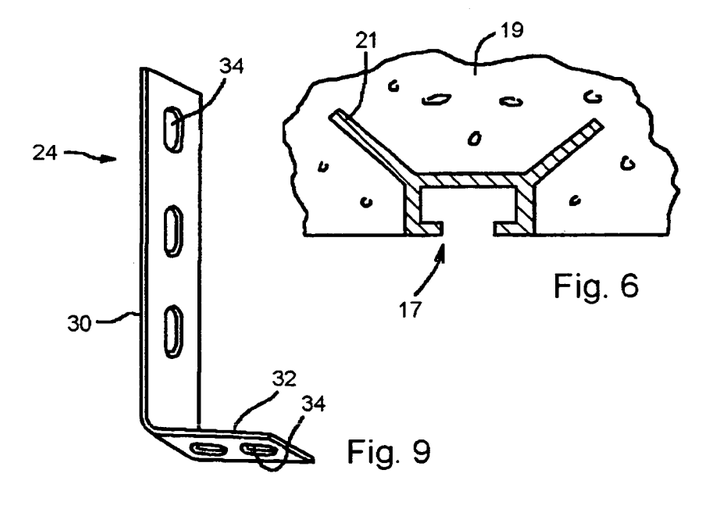
FIG. 6 is a horizontal section through a fixing channel and surrounding concrete, used when securing the cleat of FIG. 5 to a load bearing structure formed from concrete.
FIG. 9 illustrates a tie bracket used in the embodiment of FIG. 8.

As shown in FIG. 5, the end section of the bond beam and surrounding blockwork is incomplete, to expose the rebars 14. The tips of the cleat pockets 12 are just visible in this drawing too. Ordinarily, the rebars and cleats will be substantially completely encased in the concrete and blockwork, right up to the joint with the vertical steel stanchion. To prevent wet concrete from entering the space between the rebar end and each cleat pocket 12, a resilient (e.g. rubber or foamed plastics) sealing ring or collar 13 is placed over each rebar as a tight sliding fit. Prior to pouring the concrete, each ring is slid along the rebar to butt up against the end of the pocket and seal the annulus between the pocket and the rebar end. The outer diameter of the ring 13 is preferably at least as great as that of the cleat pockets 12, so that the ring forms a cushion at the end of the corresponding cleat pocket allowing for thermal movement between the pocket and the surrounding set concrete. A resilient or heat shrinkable boot or a bead of mastic sealant may be used instead of the sealing rings 13. FIG. 6 shows the upper rebar 14 and pocket 12, as well as the cleat base plate 16 and upper bolt fixing hole 18. The lower pocket (only partly shown) and the lower bolt fixing hole (not shown) are substantially identical to their upper counterparts.

FIG. 6a shows a horizontal section through a vertically oriented channel 17 formed from stainless steel or similar suitable material, which is cast into a concrete load bearing structure 19. Wings 21, which may be apertured and/or provided with roughened surfaces, help to retain the channel in the concrete. The channel 17 is of re-entrant cross-section so as to retain T-headed bolts (not shown). These may be used to secure the cleats to the load bearing structure 19 at any desired height along the channel 17.

As an alternative to the illustrated embodiment, the rebar or other reinforcement could be fixed in the sockets so as to be tensionable before or after the concrete has been poured and cured. For example the reinforcement may be fitted with a turnbuckle, or may have an end extending through the back of the socket and provided with a tensioning nut. Other known forms of tensioning, such as a hydraulic tensioning tool and socket wedges, may also be used.

Figure 7:
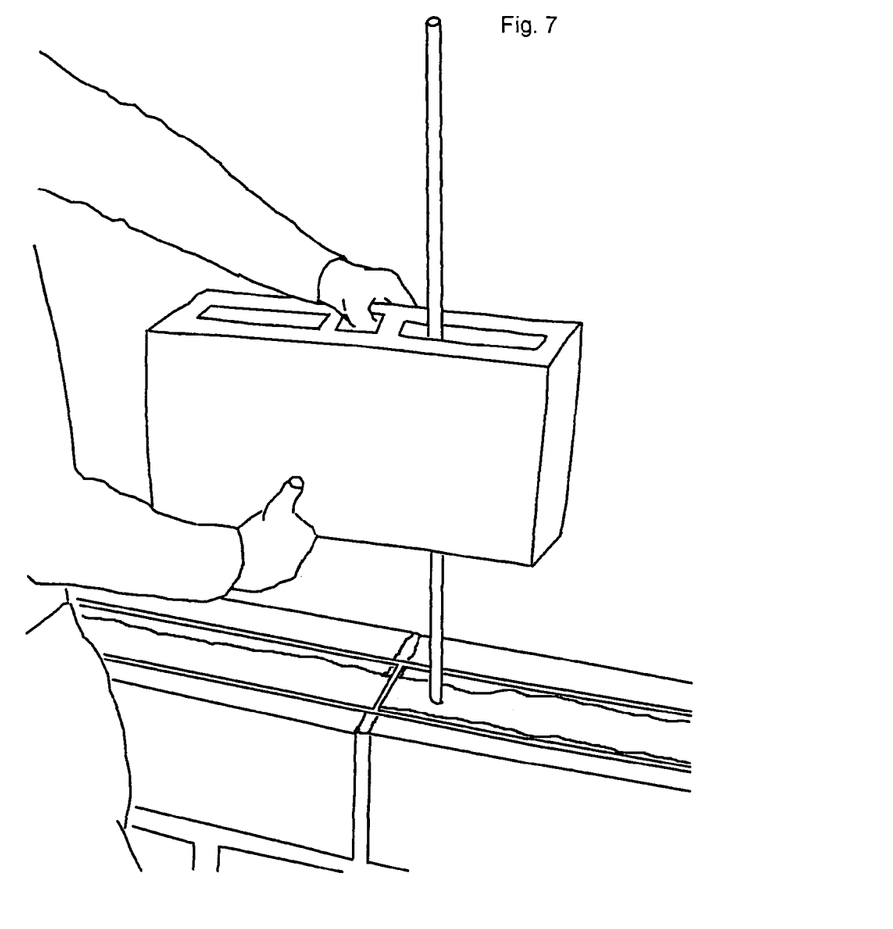
FIG. 7 demonstrates a block in the next course above the bond beam being offered up for laying.

On the next course of blockwork as it is being laid we insert a stiffening or tie rod extending from the concrete into each perp joint of the blockwork, thus providing strength in tension extending into the blockwork panel away from the bond beam. This arrangement also helps to spread and reduce shock forces e.g. arising from impacts, allowing the complete wall area to act as a unitary whole. In a variant shown in FIG. 7, hollow blocks are used, being the kind having a pair of vertical through holes, thereby defining opposed side and end walls, and a central web. As an expedient to form the hollow U-sectioned blocks, the end walls and web of the blocks just described can be partly cut away. Alternatively, special blocks formed at the outset with a U-shaped profile can be used. The rods can also extend into the bond beam from the blockwork course below, e.g. from perps of that course and through apertures in the bases of the hollow blocks surrounding the bond beam.

The above principle allows for enhanced wall deflection as the bond beam and adjacent blockwork course(s) deflect, absorb and transfer applied stresses and forces ultimately back to the vertical stanchions. This creates a stiffening/strengthening of the masonry with greater flexural and deflection resistance properties than is currently the practice with rigid steel wind post structures fixed to the soffit and floor. The standard post tends to resist applied forces up to a certain level and then disintegrate.

Our system also provides, beneficially larger work openings for building services such as ducting, pipework, cables and access crawl ways. Posts run vertically from floor to soffit obviously on occasion will restrict the service run whereas our horizontal beams tend to have no negative effect on service runs and penetration of walling.

Our new beam design increases wall capacity in compression. Flexural tolerance also increases despite minor properties in this characteristic in normal masonry.

We find that when this wall panel construction is used in buildings such as car parks, car impacts and other similar forces e.g. shopping trolley etc. impacts are absorbed and transferred to the wall panel ends and ultimately to vertical load bearing structural beams where these forces can be adequately absorbed.

In test analyses we have found that, subject to beam location, the wall will flex and deflect in directions transverse to its mid-plane. The present beam appears to increase deflection capacity by up to 25%. Also by using one or more bond beams, particularly in conjunction with reinforcing ties extending into the adjacent blockwork, transverse wall panel length can extend to 12 m and beyond, without an expansion joint. This is not possible with any other system.

The bond beam resists initial forces applied to walling, absorbing and transferring these towards its ends. As forces further increase, the beam works with the masonry, deflecting and absorbing the forces in a unitary state, and transferring them to be absorbed by the load bearing structure. This greatly increases the capacity of the wall to resist and absorb stresses and forces.

The beam works with the wall's characteristic strengths in compression and rigidity; this compatibility between beam and walling creating the enhanced performance. From observation we can confirm that the bond beam has the effect of subdividing the wall infill panel into smaller areas spanning between adjacent beams or between the lowermost beam and the floor, or between the uppermost beam and the soffit.

Figure 8:
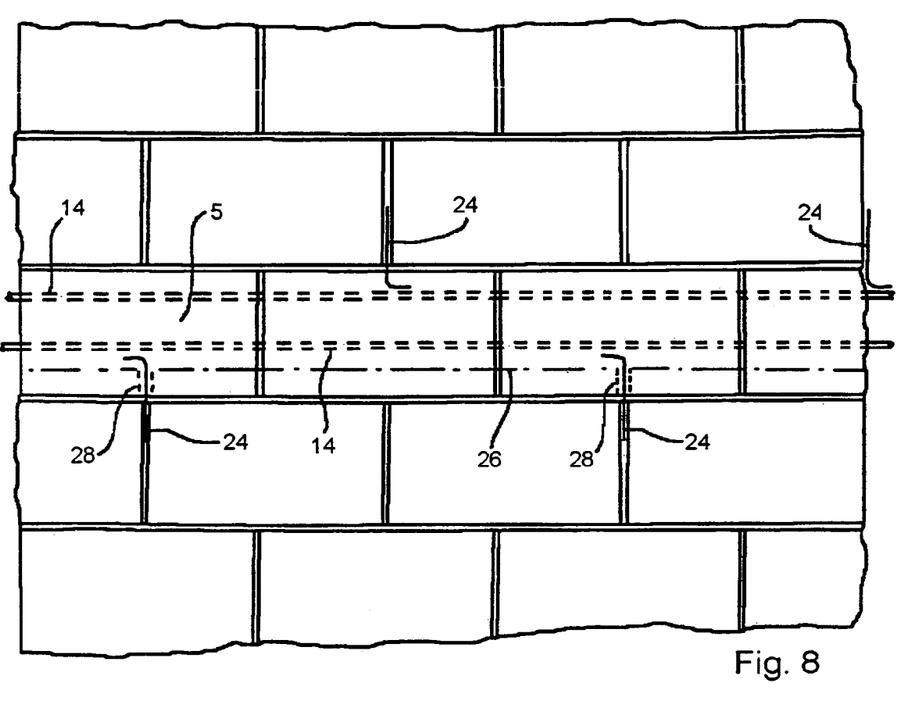
FIG. 8 illustrates an alternative bonded blockwork structure and bond beam embodying the invention.

FIG. 8 shows another bond beam construction embodying the invention. L shaped brackets 24 are used to tie the bond beam to adjacent blockwork courses both above and below. The brackets are at 450 mm centres extending alternately upwards and downwards; i.e. adjacent brackets to one or other side above or below the bond beam 5 are at 900 mm centres. The downwardly extending brackets 24 are inserted through apertures 28. These extend from the base (indicated by chain dotted line 26) of the hollow interiors of the bond beam accommodating blocks, to their lower faces. Through these apertures the longer, vertically oriented limb 30 (FIG. 9) of the downwardly extending brackets can enter the perpends of the course below the bond beam 5. The upwardly extending brackets 24 can pass directly from the bond beam 5 into the perpends of the course above. In both cases, the shorter limbs 32 of the brackets 24 extend generally horizontally in the concrete of the bond beam, to tie the brackets and thereby the adjacent blockwork courses to the bond beam. Both limbs 30, 32 of the brackets 24 may contain apertures 34 or other formations that help the bracket to key into the surrounding concrete, mortar or the like. Although the brackets are shown extending into the perpends, they may instead be grouted into apertures formed in the blocks of the adjacent courses. The construction shown contains no additional reinforcement, apart from the rebars 14 and brackets 24. Bed joint reinforcing mesh is not used, at least in the courses above and below the or each bond beam, which are tied into the bond beam course by the brackets 24.

Figure 10:
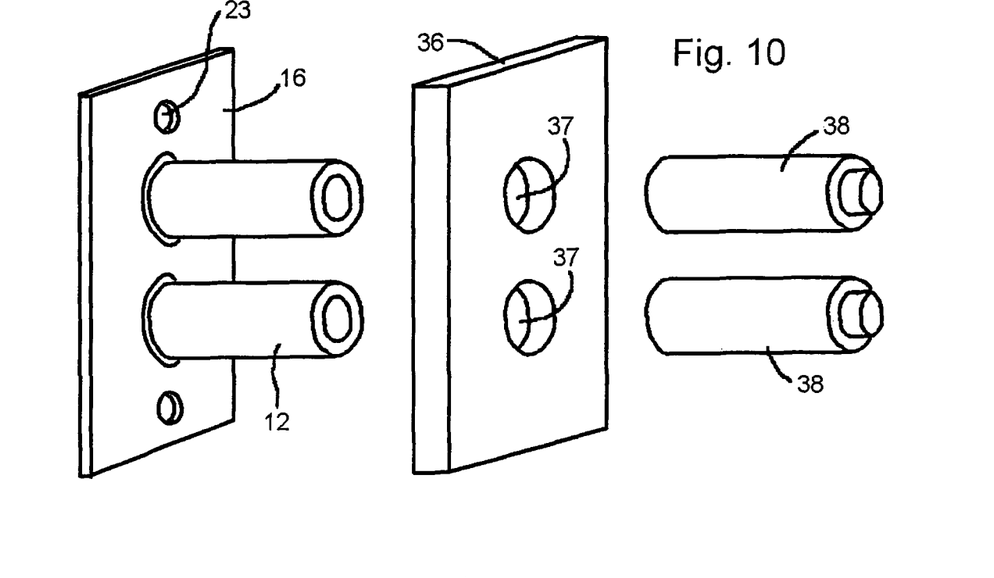
FIG. 10 is an exploded perspective view showing a cleat similar to that of FIG. 6, together with a closure plate and boots.
Figure 11:
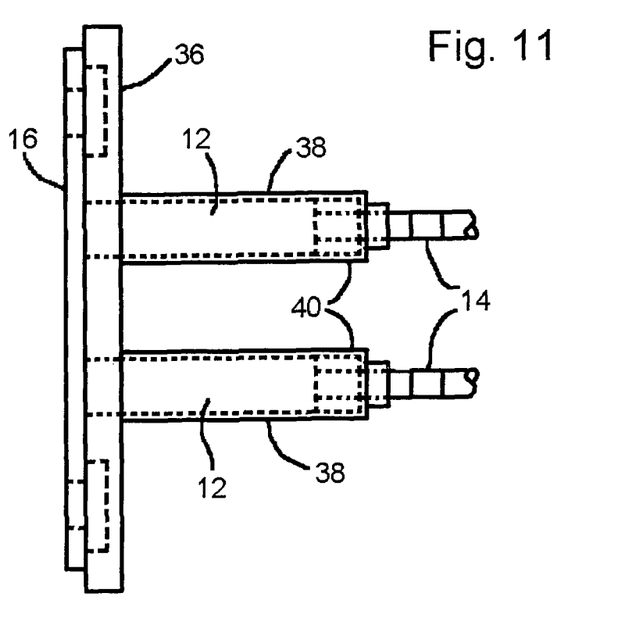
FIG. 11 is a side view showing the components of FIG. 10 assembled together with a pair of reinforcing bars.

FIG. 10 shows a closure plate 36 having a pair of holes 37 by which it can be slipped over the cleat pockets 12 after the cleat 16 has been secured to its stanchion e.g. using bolts passing through securing holes 23 into similar holes in the stanchion, or into a channel 17 such as shown in FIG. 6a. The closure plate is made of a resiliently deformable material and is of sufficient size to seat and seal against the exposed end face of the adjacent block containing the bond beam. The closure plate seals around all three sides of the opening formed in the end face by the block's hollow interior, as this block is laid and butted up against the closure plate. A boot 38 is slipped over each end of each rebar 14 before it is installed in its pocket 12. The rebar may be bowed temporarily to allow its ends to be installed in both opposing cleats. The boots 38 each have a narrow end which seals about the rebar 14, and a wider end that can be slipped over and seal around the pockets 12 (see FIG. 11). The wide end of each boot is longer than the pocket 12, so as to define an internal void 40 which accommodates longitudinal thermal movement of the rebar 14 relative to the pocket 12, when the whole is set in concrete. The boots 38 form a slip surface between the pockets and the surrounding concrete. The boots may be radially compressible to accommodate relative vertical movement between the pockets 12 and the surrounding concrete. The fairly lose fit of each rebar end in its socket can accommodate similar relative vertical movement.

The plate 36 prevents the wet concrete from running out of the endmost hollow block. If made from a suitable material (thermally/acoustically insulating and/or fireproof—e.g. mineral wool in a suitable resin binder) the plate 36 can remain in place to form part of the expansion joint between the blockwork and the stanchion. Alternatively, the closure plates can be made from a material such as expanded polystyrene or polyurethane foam, that is relatively easy to break away once the concrete of the bond beam has set. This allows installation of expansion joint material, cut to fit between the blockwork and the stanchion, and around the pockets 12.

Figure 12:
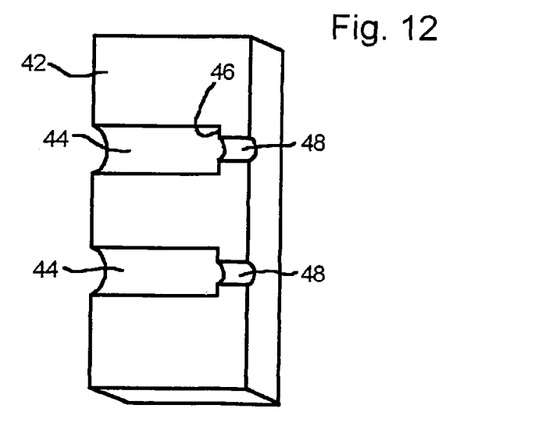
FIG. 12 shows a half shell used to form an alternative closure or collar.
Figure 13:
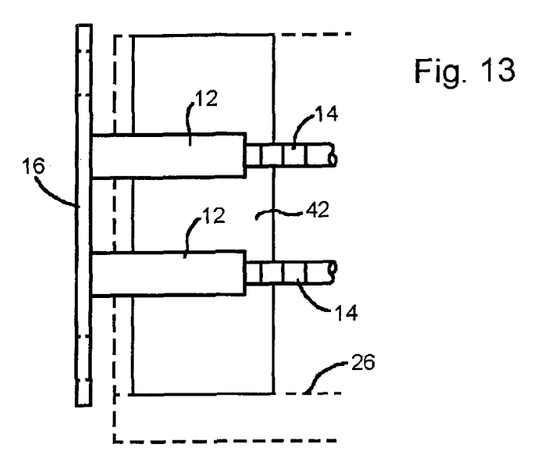
FIG. 13 shows the half shell of FIG. 12 assembled on a cleat and reinforcing bars.

FIGS. 12 and 13 show a closure in the form of a stopper half shell 42 that fits around the cleat pockets 12 to form a complete collar. The half shells are formed from a resiliently deformable material such as expanded polystyrene or polyurethane foam, and are used in pairs face-to-face, so as to completely fill the gap between the cleat pockets 12 and the hollow block interior walls at each end of the channel containing the bond beam 5. In this way, the half shells retain the wet concrete. Each half shell has a pair of larger semi-cylindrical depressions 44 which accommodate the pockets 12, and a pair of smaller semi-cylindrical depressions 48 which fit snugly around the rebars 14. The shoulders 46 defined between the depressions 46 and 48 locate the half shells correctly on the pockets 12. The material of the half shells surrounding the depressions 48 and 44 is longitudinally and radially compressible to accommodate thermal movement of the bond beam relative to the stanchion and cleat.

Figure 14:
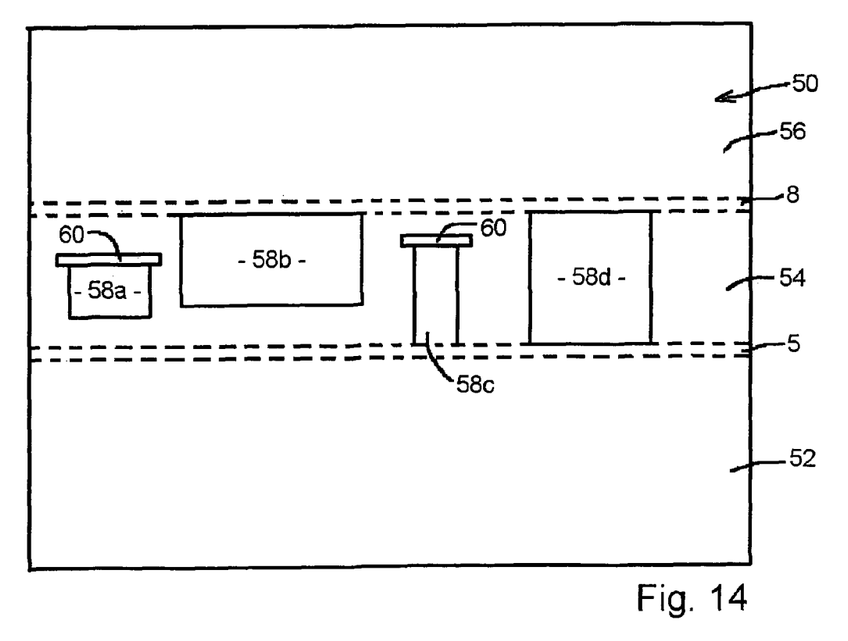
FIG. 14 shows a pair of bond beams used to reinforce a load bearing wall of bonded masonry and divide it into three sections.

The bond beam structure of the invention, including but not limited to the structures shown in FIGS. 1 and 8, can be used to reinforce a load bearing, bonded masonry wall against transverse bending. In this case, the rebars are not connected to an adjacent load bearing structure, but are simply terminated within the concrete of the bond beam. The rebar ends may be hooked or otherwise provided with enhanced anchorages within the concrete in known manner. A load bearing wall 50 containing two bond beams 5, 8 of this type is shown in FIG. 14. The bond beams divide the wall into three sections 52, 54 and 56. The centre section 54 contains a number of apertures 58a-d below the bond beam 8, e.g. for windows, doors and service penetrations. Provided that the bond beam 8 is sufficiently strong to support the masonry above each aperture if no separate lintels 60 are used, design calculations for transverse bending strength may be simplified by treating the wall simply as the upper and lower sections 52, 56 with the bond beams 5 and 8 at their upper and lower edges respectively, e.g. in accordance with BS5628 for walls with sub parts.

Bond beams embodying this invention have numerous other applications, for example:
1. Use as fixing for eyebolts, i.e. the bond beam will meet eyebolt pull out test requirements.
2. Bomb blast and security applications where added lateral bending strength is needed in a bonded masonry wall.
3. Parapet wall applications in lieu of parapet posts (that cannot have a head fixing).
4. Use as a fixing for shelf angles (exterior brick cladding etc. supports) when required between floor levels.
5. Use for supporting heavy plant/ductwork etc especially when no facility exists to hang off slab soffits/roof structures.
6. Use for fixing balconies, external walkways and similar cantilevered structures to blocks of flats or the like.
7. When fixing heavy items to a wall, e.g. in factories, offices, shops, garages and museums, or even in the domestic environment, for items such as water tanks, roller shutters, wall cupboards and flat screen TVs.
8. Use in reinforcing bonded masonry retaining walls, especially but not exclusively in wet conditions (harbour/swimming pool/tunnel/cellar etc).
9. When building a wall in a place where access is limited and only small components can be delivered, i.e. where there is no room to manoeuvre lintels, wind posts and other larger items.
10. Where labour is much cheaper than metal. For example it is preferable to have a man mixing concrete for a day at £6 an hour than pay £300 for a wind post.
11. Use in forming a reinforced bonded masonry lift shaft. Accordingly, a lift can be installed in an existing building without the need for a large cast reinforced concrete core.
12. Use as a padstone system to sit beams on.
13. Use in stack bonded masonry to introduce intermediate lateral stiffeners.

The invention claimed is:
1. A masonry structure in an infill space in a pre-existing load bearing structure, the masonry structure comprising:
one or more courses of masonry;
a reinforced concrete casting which comprises a concrete reinforcing bar, the reinforced concrete casting being located above the masonry courses and extending from one side of the infill space to the other;
the masonry structure comprising one or more further courses of masonry above the reinforced concrete casting;
a cleat having a mounting plate secured to the pre-existing load bearing structure, said cleat further comprising an elongate socket carried by the mounting plate and hav- ing a longitudinal socket axis extending parallel to said one or more courses of masonry; and wherein the end of the reinforcing bar is received in said socket;

wherein said elongate socket enables longitudinal sliding movement between the reinforcing bar and the elongate socket configured to accommodate differential expansion between the masonry structure and the load bearing structure.

2. A masonry infill for an infill space defined between first and second spaced-apart vertical supports of a pre-existing load bearing structure, the masonry infill comprising:

one or more courses of masonry, each of which comprises an end that terminates at a corresponding one of the first and second vertical supports;

a reinforced concrete casting which comprises a concrete reinforcement and which is located above the masonry courses and extends between the first and second vertical supports;

a cleat comprising a mounting plate secured to an outer surface of the first vertical support, the cleat further comprising an elongate socket carried by the mounting plate and having a longitudinal socket axis directed towards the second vertical support;

an end of the concrete reinforcement received in said elongate socket;

the masonry structure comprising one or more further courses of masonry above the reinforced concrete casting;

wherein the masonry infill extends from one side of the infill space to the other;

whereby said elongate socket enables longitudinal sliding between the concrete reinforcement and the elongate socket configured to accommodate differential expansion between the masonry infill and the load bearing structure.

3. A structure as defined in claim 2, comprising a masonry course which itself defines inner and outer walls of the casting space.

4. A structure as defined in claim 3, in which the inner and outer wall-defining course is formed from blocks having a U-shaped cross-section.

5. A structure as defined in claim 2, in which the reinforcing material comprises steel bar.

6. A structure as defined in claim 2, in which one or more courses of masonry above and/or below the concrete are tied into the concrete by reinforcements extending into the concrete and into mortar filled spaces in or between the units of masonry in these courses.

7. A structure as defined in claim 2, in which edges of the masonry infill are secured to the load bearing structure by means other than the attachment at the reinforcement.

8. A structure as defined in claim 2, further comprising reinforced mortar beds between the masonry courses.

9. A method of constructing a masonry infill in an infill space in a pre-existing load bearing structure, the method comprising the steps of:

laying one or more courses of masonry;

partitioning off a casting space having as its base a then uppermost course of masonry, the casting space extending from one side of the infill space to the other;

providing a cleat comprising a mounting plate secured to an outer surface of said pre-existing load bearing structure at said infill space, said cleat further comprising an elongate socket carried by the mounting plate and having a longitudinal socket axis extending parallel to said one or more courses of masonry;

positioning at least one reinforcing bar in the casting space;

inserting an end of the reinforcing bar into said elongate socket;

filling the casting space with concrete; and laying one or more further courses of masonry on top of the filled casting space;

whereby said elongate socket enables longitudinal sliding movement between the reinforcing bar and the elongate socket configured to accommodate differential expansion between the masonry infill and the load bearing structure.

10. A method as defined in claim 9, in which the load bearing structure is a metal frame.

11. A method as defined in claim 9, further comprising using a seal to prevent the wet concrete from entering the socket as the casting space is filled.

12. A method of constructing a masonry infill in an infill space between first and second spaced-apart vertical supports of a pre-existing load bearing structure, the method comprising the steps of:

laying one or more courses of masonry, each of which comprises an end that terminates at a corresponding one of said first and second vertical supports;

partitioning off a casting space between the first and second vertical supports, the casting space having as its base a then uppermost course of masonry;

positioning reinforcing material in the casting space;

securing a cleat to the first vertical support, the cleat comprising a mounting plate secured to an outer surface of the first vertical support, the cleat further comprising an elongate socket carried by the mounting plate and having a longitudinal socket axis directed towards the second vertical support;

inserting an end of the reinforcing material into said elongate socket filling the casting space with concrete; and laying one or more further courses of masonry on top of the filled casting space;

wherein the masonry infill extends from one side of the infill space to the other;

whereby said elongate socket enables longitudinal sliding movement between the reinforcing material and the elongate socket configured to accommodate differential expansion between the masonry infill and the load bearing structure.

13. A method as defined in claim 12, in which the step of partitioning off the casting space comprises installing removable shuttering.

14. A method as defined in claim 13, in which the shuttering is aligned with inner and outer faces of the masonry courses.

15. A method as defined in claim 12, in which one or more masonry courses define inner and outer walls on either side of the casting space.

16. A method as defined in claim 15, in which the casting space-defining course is formed from blocks having a U-shaped cross-section.

17. A method as defined in claim 12, in which the reinforcing material comprises steel bar.

18. A method as defined in claim 12, in which one or more courses of masonry above and/or below the concrete are tied into the concrete by reinforcements extending into the concrete and into mortar filled spaces in or between the units of masonry in these courses.

19. A method as defined in any preceding claim, in which edges of the masonry infill are secured to the load bearing structure by means additional to the attachment at the reinforcement.

* * * * *